United States Patent
Pirttilahti et al.

(10) Patent No.: US 8,385,993 B2
(45) Date of Patent: Feb. 26, 2013

(54) RESILIENT LEVER FOR A FLIP TOP DEVICE

(75) Inventors: Juha K. Pirttilahti, Nokia (FI); Pasi Kemppinen, Tampere (FI)

(73) Assignee: Nokia Corporation, Espoo (FI)

( * ) Notice: Subject to any disclaimer, the term of this patent is extended or adjusted under 35 U.S.C. 154(b) by 153 days.

(21) Appl. No.: 12/513,969

(22) PCT Filed: Nov. 7, 2006

(86) PCT No.: PCT/FI2006/000355
§ 371 (c)(1),
(2), (4) Date: Apr. 30, 2010

(87) PCT Pub. No.: WO2008/056019
PCT Pub. Date: May 15, 2008

(65) Prior Publication Data
US 2010/0210328 A1  Aug. 19, 2010

(51) Int. Cl.
*H04M 1/00* (2006.01)
(52) U.S. Cl. ............... 455/575.4; 455/575.1; 455/575.3; 455/90.3
(58) Field of Classification Search ............... 455/575.1, 455/575.4, 90.3, 575.3
See application file for complete search history.

(56) References Cited

U.S. PATENT DOCUMENTS
5,363,089 A    11/1994  Goldenberg
7,158,634 B2   1/2007   Eromaki
(Continued)

FOREIGN PATENT DOCUMENTS
CN  2631142 Y   8/2004
EP  1107091 A   6/2001
(Continued)

OTHER PUBLICATIONS

International Search Report and Written Opinion received in corresponding Patent Cooperation Treaty Application No. PCT/FI2006/000355, Aug. 2, 2007, 12 pages.

(Continued)

*Primary Examiner* — Temica M Beamer
(74) *Attorney, Agent, or Firm* — Harrinton & Smith

(57) ABSTRACT

In an embodiment a resilient lever is placed between the top body and the bottom body of a flip top electronic apparatus. The axles of the lever are located so that a front edge of the top body stays near the bottom body during the movement of the top body over a keypad on the bottom body. An end of the top body jumps or slides over the bottom body, e.g. keyboard. The resilient feature gives the locking effect in the open and closed positions of the apparatus. There can be one, two or more resilient members. In an embodiment a rail is positioned to the bottom body. A resilient follower is attached to the top body. The resilient follower is also attached to the rail. Thereby these elements bound top body's front edge to the bottom body. The first body portion can be a top body having a display chassis, for example a lid. The second body portion can be a bottom body having a keyboard or a keypad, for example the second body portion can be an engine block having a chassis. Thereby the first body portion slides or jumps over the second body portion so that a user can comfortable hold the apparatus. The fingers do not discomfort the visibility of the display. The bodies are substantially parallel with respect to each other.

20 Claims, 12 Drawing Sheets

U.S. PATENT DOCUMENTS

| | | | |
|---|---|---|---|
| 7,353,050 B2 * | 4/2008 | Im et al. | 455/575.3 |
| 7,492,891 B2 * | 2/2009 | Eldon | 379/433.12 |
| 7,522,945 B2 | 4/2009 | Kilpi | |
| 7,587,226 B2 * | 9/2009 | Makino | 455/575.3 |
| 7,599,487 B2 * | 10/2009 | Lim | 379/433.12 |
| 7,599,721 B2 * | 10/2009 | Taki et al. | 455/575.1 |
| 2003/0125081 A1 | 7/2003 | Boesen | |
| 2005/0044665 A1 | 3/2005 | Kuramochi | |
| 2006/0128449 A1 | 6/2006 | Park | |
| 2007/0254730 A1 * | 11/2007 | Kim et al. | 455/575.4 |
| 2008/0032637 A1 | 2/2008 | Ladouceur | |
| 2010/0285852 A1 * | 11/2010 | Stephenson | 455/575.4 |

FOREIGN PATENT DOCUMENTS

| | | |
|---|---|---|
| JP | 9044097 A | 2/1997 |
| JP | 2005228069 A | 8/2005 |
| JP | 2006186577 A | 7/2006 |
| JP | 2006186699 A | 7/2006 |
| WO | 2006106374 A1 | 10/2006 |

OTHER PUBLICATIONS

Office Action received in corresponding Chinese Application No. 200680056294.3, Jan. 18, 2011, 18 pages.

Extended European Search Report received in corresponding European Application No. 068079821, Nov. 17, 2009, 7 pages.

Office Action received in corresponding Russian Application No. 200911928/09, Aug. 25, 2010, 6 pages.

* cited by examiner

RESILIENT LEVER FOR A FLIP TOP DEVICE

TECHNICAL FIELD OF THE INVENTION

The invention concerns a portable wireless digital communication apparatus.

BACKGROUND ART

A flip-top based device such as a flip-top phone comprises a top body portion, a bottom body portion and a joint member. Examples of the top body portion is a lid having a display and chassis, the bottom body portion can be an engine chassis, and the join member can be a hinge part or a hinge. The bodies are connected to each other with the joint member, e.g. hinge part, which allows movement between blocks.

Because of two axles between the top and the bottom bodies, the top body's front edge is possible to lift up and device opens like a book. However that movement can give a low quality feeling for the device. For example the device can open or close accidentally, like a book. Furthermore signal wires between the top and the bottom body (for example flex and/or coaxial cables) are exposed to damage, and that is a major problem. For example an end-user can touch or even tamper the signal wires accidentally or on purpose.

The "book like opening" problem has been tried to be solved by using torsion spring on the axle of the top block. For example by the flip top phone having a torsion spring in the hinge. However this known solution still exposes the signal wires into the damage. Furthermore despite the torsion spring for the "book like opening" the mechanical structure of the flip top device is still vulnerable to mechanical shocks and in particularly to mechanical twisting. Yet furthermore the noise when the top block slams to the bottom to the closed position can be rather annoying.

SUMMARY

It is therefore the object of the invention to mitigate the book like opening mechanics.

In accordance with an aspect of the invention there is provided a portable wireless digital communication apparatus, comprising
- a first body portion,
- a second body portion,
- a joint member allowing movement between the body portions, and
- at least one resilient member arranged to be fixed with the joint member so that in a substantial closed position of the apparatus an end of the first body portion is arranged to be pressed to the second body portion, and in a substantial open position of the apparatus said end is arranged to be also pressed to the second body portion.

In accordance with another aspect of the invention there is provided an electronic device, comprising
- a first body portion and a second body portion,
- said first and second body portion arranged to be positioned substanitally parallel in a first operational mode,
- and said first and second body portion having an obtuse disposition in a second operational mode,
- wherein the first and second body portion are resiliently coupled for relative movement such that relative movement between the first and second body portion has a first transition region where relative movement is opposed and a second transition region where relative movement is unopposed.

In an embodiment of the invention a resilient lever is placed between the top body and the bottom body. The lever is thus divergent to the joint member. The axles of the lever are located so that a front edge of the top body stays near the bottom body during the movement of the top body over a keypad on the bottom body. An end of the top body jumps or slides over the bottom body, e.g. keyboard. The resilient feature gives the locking effect in the open and closed positions of the apparatus. There can be one, two or more resilient members.

In an embodiment of the invention a rail is positioned to the bottom body. A resilient follower is attached to the top body. The resilient follower is also attached to the rail. Thereby these elements bound top body's front edge to the bottom body.

In an embodiment of the invention the first body portion is a top body having a display chassis. The first body portion can be a lid. The second body portion is bottom body having a keyboard or a keypad. The second body portion can be an engine block having a chassis. Thereby the first body portion slides over the second body portion so that a user can comfortable hold the apparatus. The fingers do not discomfort the visibility of the display. Furthermore thumbs of the user may be used for typing, or either one of the hand can be used for typing.

BRIEF DESCRIPTION OF THE DRAWINGS

The invention will now be described, by way of examples only, with reference to the accompanying drawings, in which.

DESCRIPTION OF FURTHER EMBODIMENTS

In an embodiment of the invention the length of the resilient lever (or alternatively the lengths of the levers) is fixed so that in the beginning of top body portion's movement the resilient lever presses top body portion's front edge towards bottom body portion's sliding surfaces. After a short sliding movement top body portion's front edge starts to rise above bottom body portion's keypad surface. When the keypad is crossed, top body portion's front edge starts to press again towards bottom body portion's sliding surfaces and the resilient lever is drawn. After short movement, the resilient load of the resilient lever starts to release and the portable wireless communication apparatus is locked to the open position.

Figure 1:
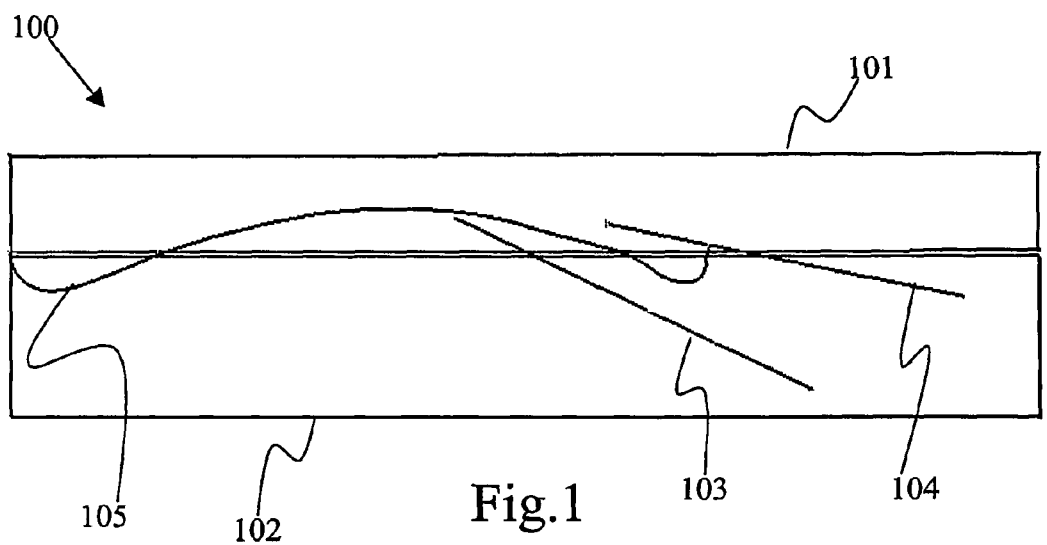
FIG. 1 depicts a cross-section of the apparatus in the closed position according to an embodiment of the invention.

Referring now to FIG. 1 there is being depicted a cross-section of the apparatus in the closed position according to an embodiment of the invention. A portable wireless communication apparatus 100 such as a flip top mobile phone is depicted in FIG. 1. In some embodiments the apparatus 100 can also be a laptop computer, an electric palm apparatus, a palm computer, an electric hand-held notebook device, etc. The apparatus 100 comprises a first body portion 101 (later-natively referred to as first body). An example of the first body is a top body. The top body can be a lid of a flip top device (or a lid of a shellfish device). In an embodiment the first body 101 comprises a display of the apparatus 100. Furthermore the first body 101 can be a part of the chassis of the apparatus 100.

The apparatus 100 comprises also a second body portion 102 (alternatively referred to as a second body). An example of the second body is a bottom body. The bottom body can be an engine body of a flip top device (or an engine of a shellfish device). In an embodiment the bottom body 102 comprises a keyboard or a keypad of the apparatus 100. Furthermore the second body can be a part of the chassis of the apparatus 100. The apparatus 100 comprises also a resilient element 103. In an embodiment the resilient element 103 is a spring, helical spring, a lever made of rubber, etc. The resilient lever 103 can be attached to the first and the second body 101,102 by axle pins, for example. The apparatus 100 comprises also a joint member 104. An example of a joint member 104 is a joint, a hinge or a hinge system. The hinge can have a lever and axes connecting the lever into the first and the second body 101, 102. A reference 105 depicts a theoretical path, which an end, for example an edge, of the first body 101 would travel if the lever 103 and the joint member 104 would both be fixed, e.g. solid.

In an embodiment advantageously the first body 101 is locked or pressed into the second body. 102 by the force applied by the resilient lever 103. Thus the configuration of the resilient lever 103 and the joint member 104 in the apparatus 100 is such the edge of the first body 101 is pressed to the second body 102. The pressure establishes a locking feeling of the bodies 101,102 for the apparatus 100.

Figure 2:
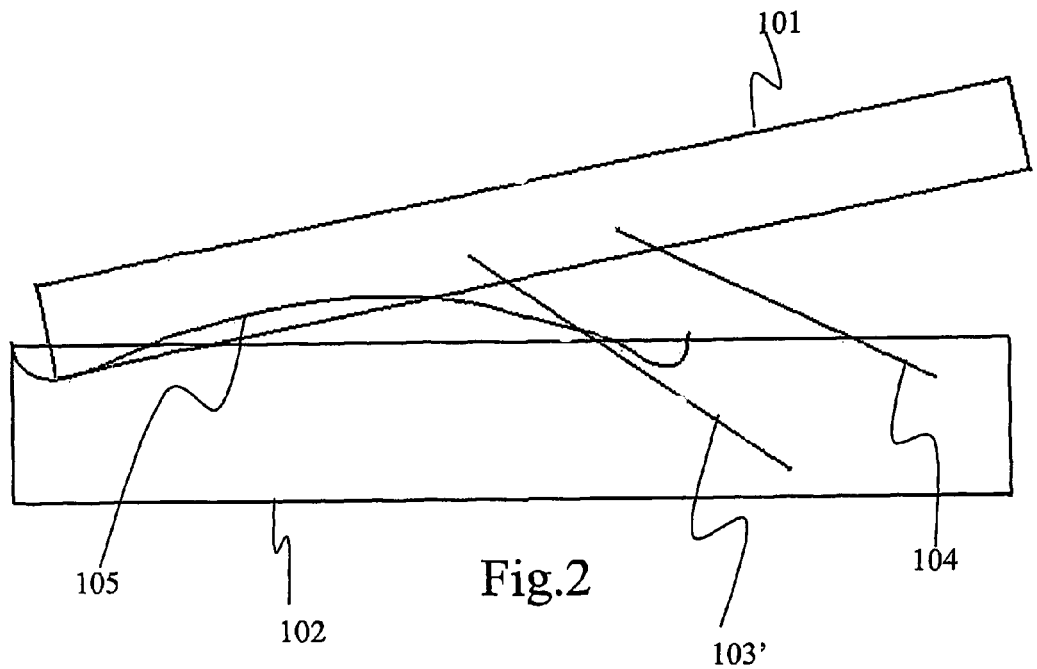
FIG. 2 depicts a cross-section of the movement path according to an embodiment of the invention.
Figure 3:
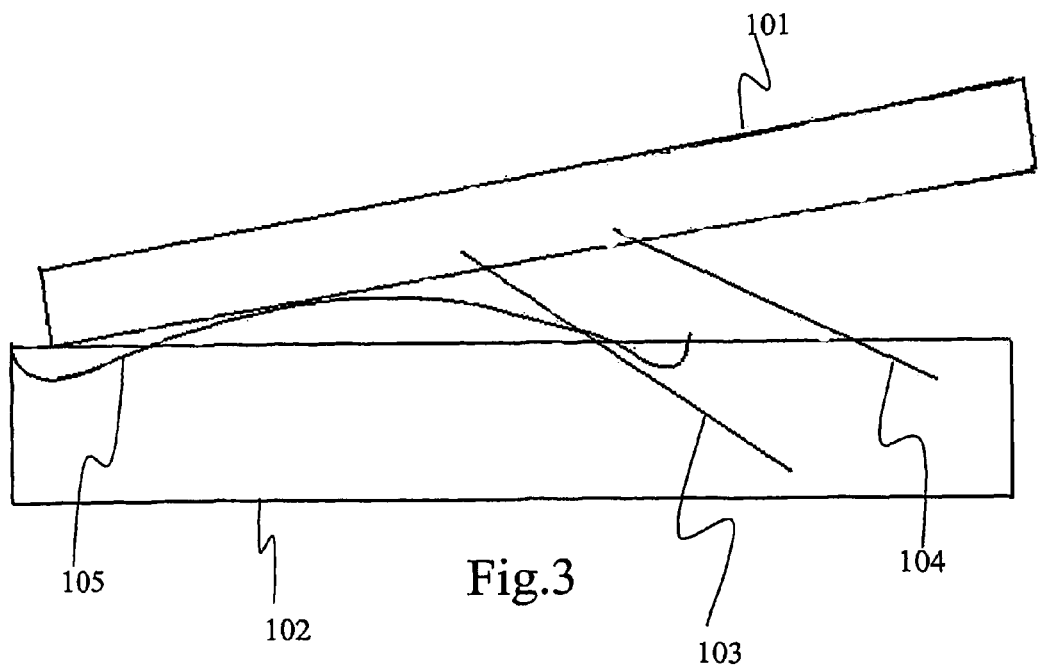
FIG. 3 depicts a cross-section of the apparatus according to the embodiment of the invention.

Referring now to FIGS. 2 and 3 in the beginning of first body's opening movement the front edge of the first body 101 tries to penetrate to the second body 102. This is shown in FIGS. 2 and 3. In FIG. 2 where the assisting lever 103' is solid the edge follows the path 105.

In FIG. 3 with the resilient lever 103, the phenomenon is converted to the first body's front edge's pressure against the second body's edge. The second body's edge can be a sliding element allowing the first body's edge to slide and be pressed against the second body 102.

In the FIG. 3 the resilient lever 103 such as spring type lever is shown as a line 103. In FIG. 3 with respect to FIG. 2 a length of the lever 103 changes from nominal to extended length (for example from 24.24 mm to 24.67 mm).

Figure 4:
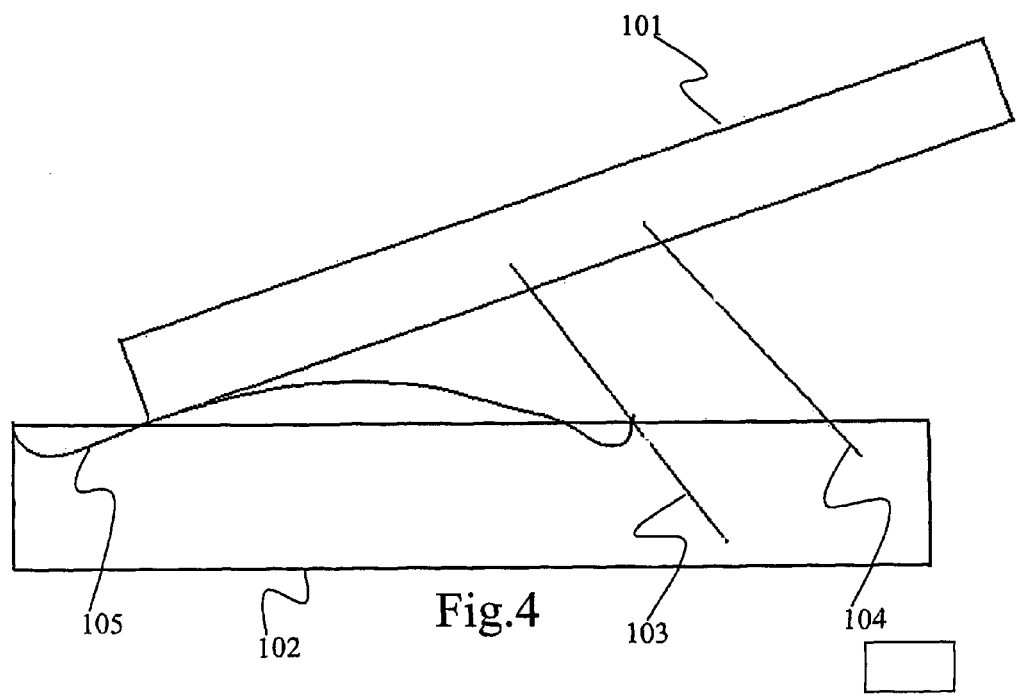
FIG. 4 depicts a cross-section of the apparatus according to the embodiment of the invention.
Figure 5:
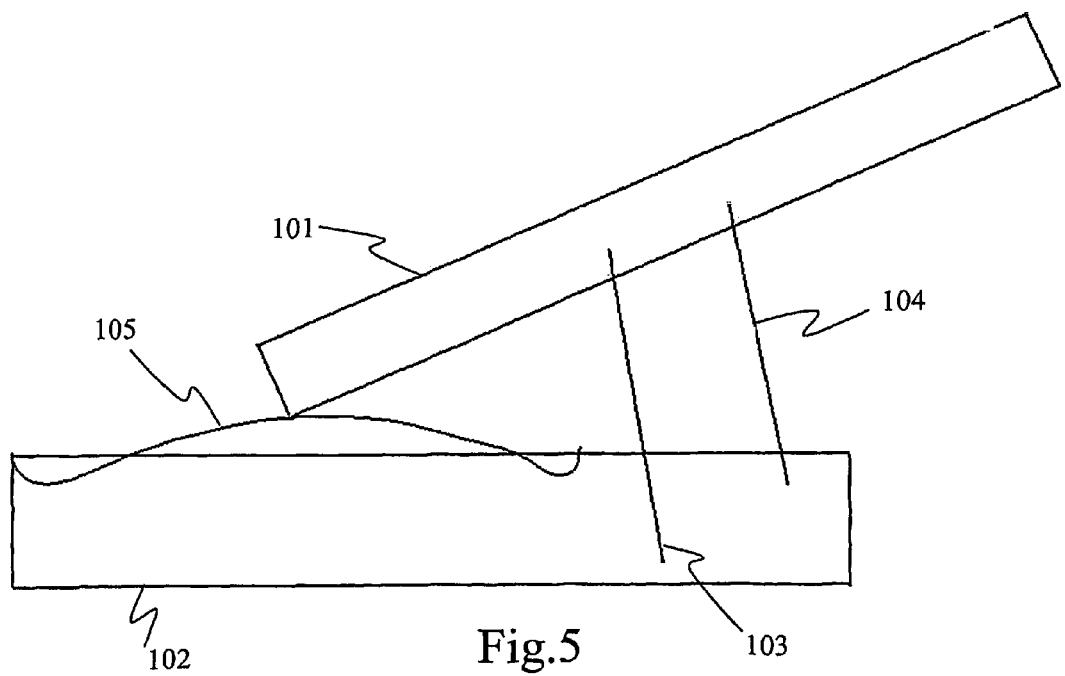
FIG. 5 depicts a cross-section of the apparatus where the top block is separated from the bottom block according to an embodiment of the invention.

Referring now to FIG. 4 the first body 101 starts to move or slide towards the open position. After the slide movement the first body's front edge's pressure against the second body 102 begins to release. The front edge of the first body 101 starts to follow its path 105 and jumps over the second body 102. The length of the lever 103 returns back to a nominal length in FIG. 5. The lever 103 and the joint member 104 is configured so that the edge may not scratch the surface of the second body in the substantial centre between the open and the closed position. For example the keyboard is thereby saved.

Figure 6:
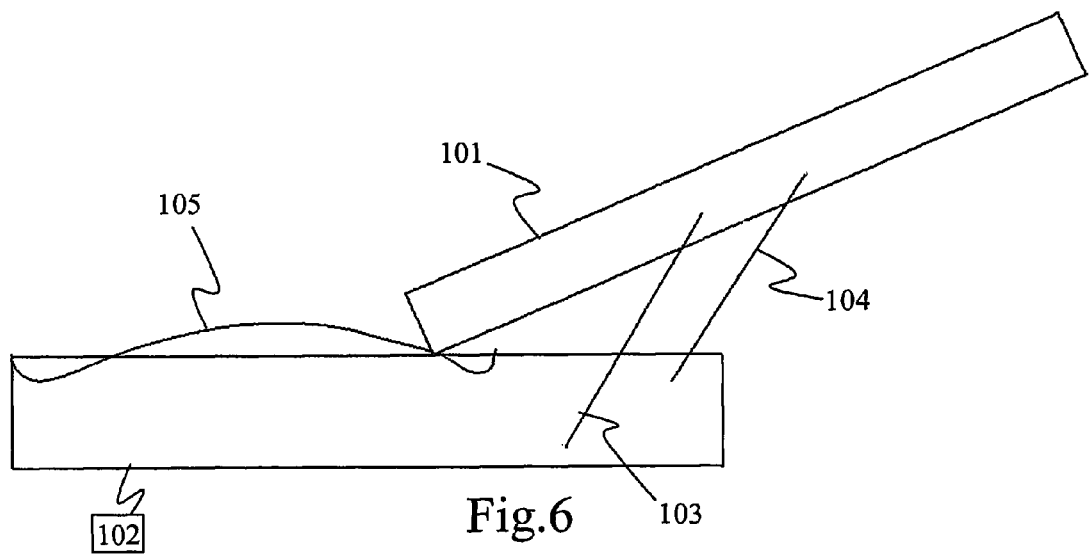
FIG. 6 depicts a cross-section of the apparatus according to the embodiment of the invention.

At the end of opening movement the front edge of the first body 101 starts to approach the second block 102 again as shown in FIG. 6.

Figure 7:
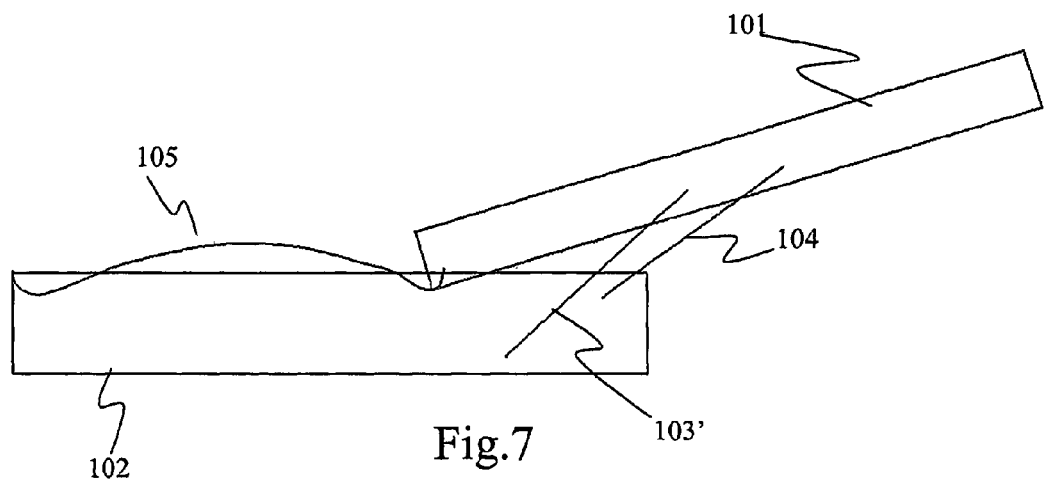
FIG. 7 depicts a cross-section of the movement path according to an embodiment of the invention.

In FIG. 7 in the end of the first body's opening movement the front edge tries to penetrate to the second body 102. If the assisting lever 103' is solid and there is no obstacle on the respective part of the surface of the second body as the edge follows the path, the edge enters into the second body 102.

Figure 8:
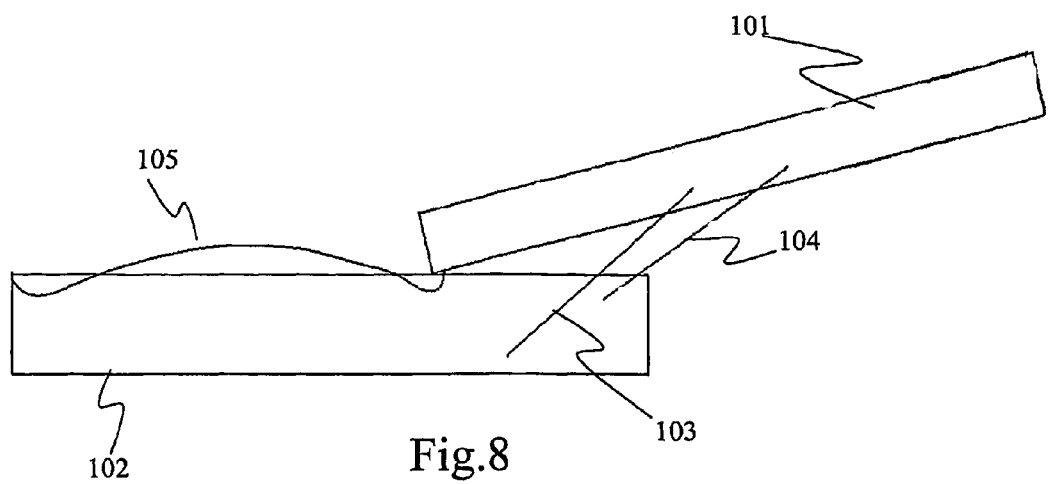
FIG. 8 depicts a cross-section of the apparatus where the top block is approaching the second body portion according to an embodiment of the invention.

With the resilient lever 103 that phenomenon is converted to the front edge's pressure against the second body 102 as shown in FIG. 8. For example against the sliding elements of the second body located at the end of the second body.

Figure 9:
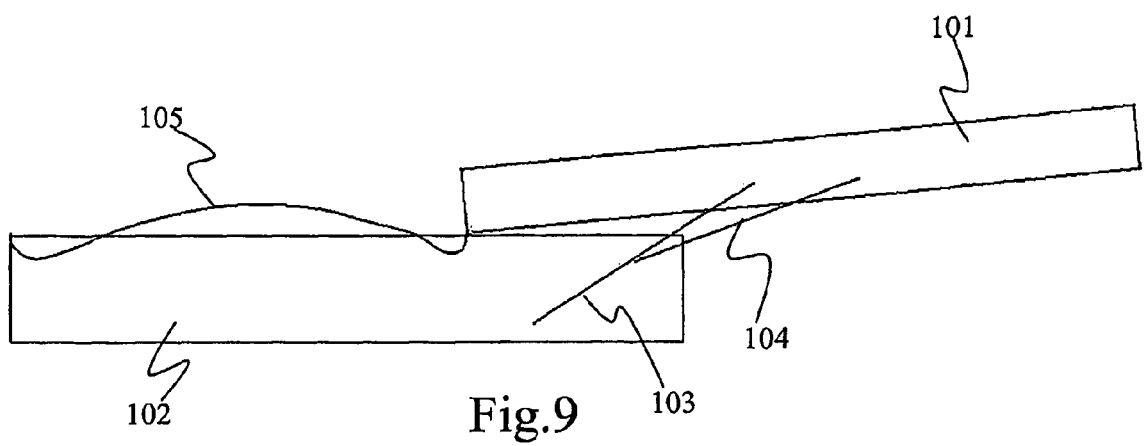
FIG. 9 depicts a cross-section of the apparatus in the open position according to an embodiment of the invention.

Referring now to FIG. 9 after the opening slide movement the front edge's pressure against engine body releases. The resilient lever length returns back to a nominal length. The apparatus is locked to open position. Thus advantageously in an embodiment the first body 101 is locked or pressed into the second body 102 by the force applied by the resilient lever 103. Thus the configuration of the resilient lever 103 and the joint member 104 in the apparatus 100 is such that the first body 101 is locked into the open position with respect to the second body 102 by releasing the resilient lever 103 into the nominal length. Thus the joint member 104 and the lever 103 are configured so that there is a force maintaining the first block 101 at an open position. The force establishes a locking effect of the bodies 101,102 for the apparatus 100 also in the open position.

In an embodiment of the invention the lever 103 may be a lever system comprising a resilient lever and a solid lever. Thus the lever may comprise two parts. The solid lever can be used as a safety lever in order to prevent excess stretching of the resilient lever. However, the solid lever (i.e. the securing lever) is not an essential feature for the invention. In the following figure the resilient lever and the possible securing lever are replaced with simple white line that length is varying.

The securing lever can be assembled alongside with the resilient lever. An oval pinhole on the securing lever allows the resilient lever to stretch only what is needed for sliding operation.

Figure 10:
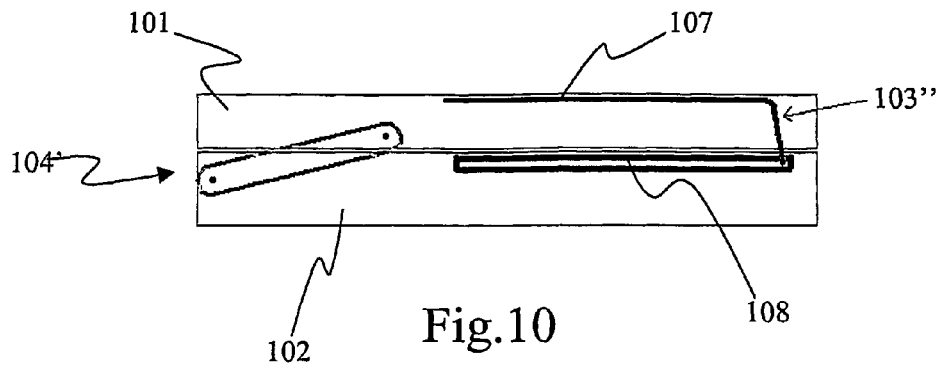
FIG. 10 depicts a cross-section of the apparatus in the closed position according to an embodiment of the invention.
Figure 11:
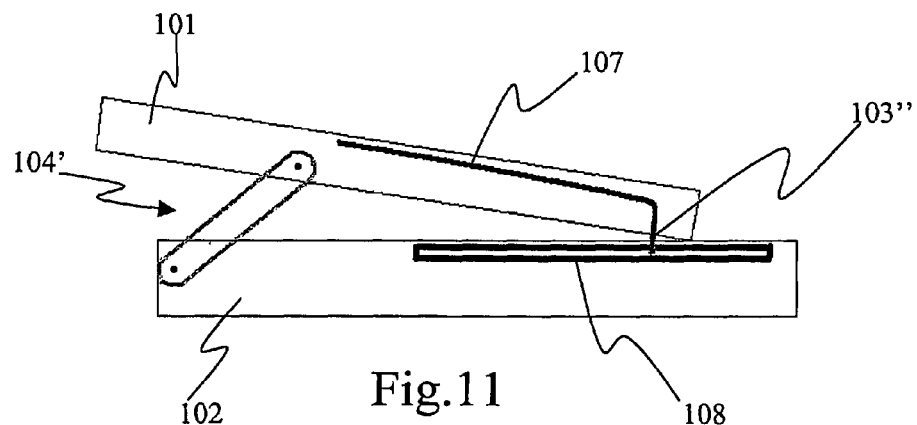
FIG. 11 depicts a cross-section of the apparatus according to an embodiment of the invention.
Figure 12:
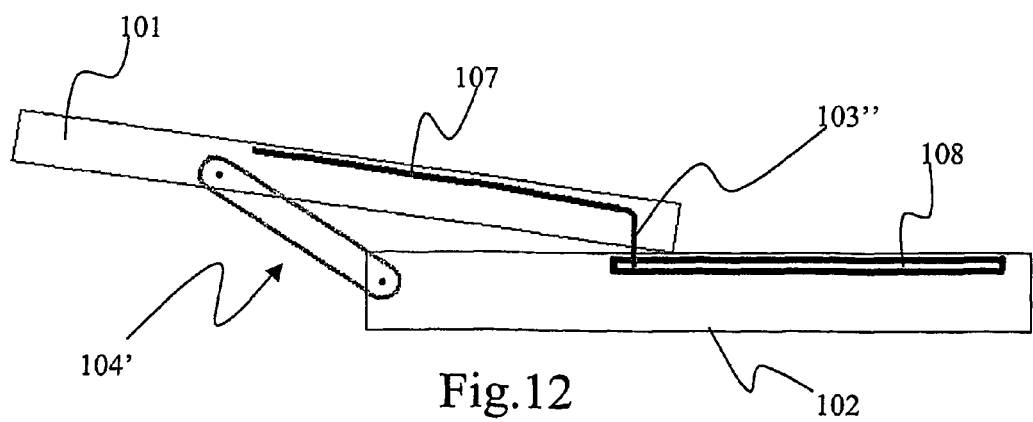
FIG. 12 depicts a cross-section of the apparatus in the open position according to an embodiment of the invention.

FIGS. 10, 11 and 12 depict an embodiment of the invention, wherein a resilient member can be a resilient follower 103". In the embodiment the portable wireless communication apparatus 100 comprises a rail 108. The rail can be positioned onto the surface of the bottom body 102. The rail 108 can be used to prevent the first body's (such as the lid) free movement around the pivot point. During the movement, the first body 101 is sliding over the second body 102 and support tabs and sliding surfaces are lifting the front edge of the first body. In an embodiment the sliding surfaces are located on both sides of the qwerty—keypad of the second body 102.

Thus the apparatus 100 comprises the follower 103". The follower can be resilient or alternatively even solid. The follower 103" is attached to the top body 101 by the lengthening 107. The follower 103" is thus attached both to the top body 101 and bottom body 102. The apparatus comprises also a joint member 104'. Meaning of the element 103" is assist lid opening and ensure its closing.

The follower 103" and the joint member 104' are fixed so that in the beginning of top body's movement the top body's front edge is pressed towards bottom body's sliding surfaces. After a short sliding movement top body's front edge slides on bottom body's surface. When the keypad is crossed, top body's front edge starts to be pressed again towards bottom body's sliding surfaces. After short movement, the pressing load of the starts to release and the portable wireless communication apparatus 100 is locked to the open position.

The rail 108 and the resilient element 103" system compensates the distance change (in z-direction) between the first and the second bodies 101,102 during the opening and/or the closing movement. This can be used because the fixing point of the follower 103" isn't optimal. To be optimal, the fixing point must be on the tip of the lid's front edge. That is not possible without putting the rail system in the middle of the qwerty keypad and thus dividing the keypad in two separate pieces. Thereby there are (at least) two different ways to compensate the z-direction distance change: Flexible, spring loaded, etc. follower and direct rail system for it, and a fixed follower and curved rail system.

Thus the rail 108 and the follower 103" is possible to carry out in various different ways. For example a curved rail in the bottom body 102 and even a solid follower in the top body 101. Alternatively a straight rail 108 in the bottom body 102 and a resilient follower 103" in the top body 101. The last mentioned saves space in the bottom body's stack up.

Figure 13:
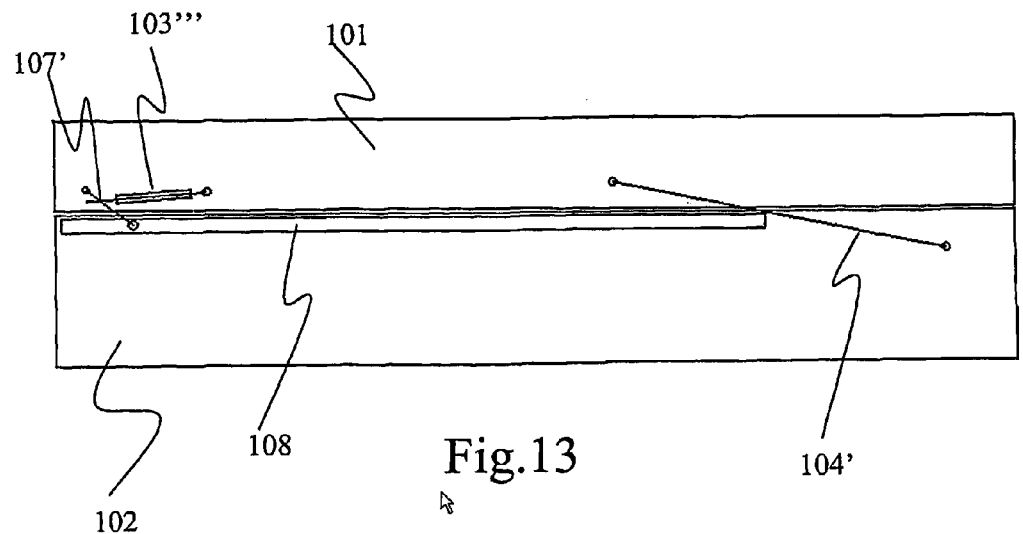
FIG. 13 depicts a cross-section of the apparatus in the closed position according to an embodiment of the invention.

Referring now to FIG. 13 there is being depicted a cross-section of the apparatus in the closed position according to an embodiment of the invention. The apparatus 100" comprises the first body 101. The apparatus 100" comprises also the second body 102. The apparatus 100" comprises also a resilient lever 103'". The resilient lever such as a follower can be the resilient follower or even the solid follower. In an embodiment the follower 103'" is a spring, helical spring, a lever made of rubber, etc. The resilient lever 103'" can be attached to the first and the second body 101,102 by axle pins, for example. The apparatus 100" comprises also a joint member 104'. An example of the joint member 104' is a hinge or a hinge system. The hinge can have a lever and axes connecting the lever into the first and the second body 101,102. The joint member 104' assists in the first body 101 closing.

The theoretical path, which an end, for example an edge, of the first body 101 would travel ff the levers 103'" and 104' would both be fixed can also be theoretically applied to this example.

In an embodiment advantageously the first body 101 is locked or pressed into the second body 102 by the force applied by the resilient follower 103'", thus the resilient lever. Thus the configuration of the resilient follower 103'" and the joint member 104' in the apparatus 100" is such the edge of the first body 101 is pressed to the second body 102. The pressure force establishes the locking feeling of the body 101,102 for the apparatus 100".

Torque in the resilient member 103'" can be around 8.9 Nmm, for example. That would cause about 7.7N normal force between the first body 101 and the second body 102. It should be noted that these numeral values are only described as one example of various different alternatives.

Figure 14:
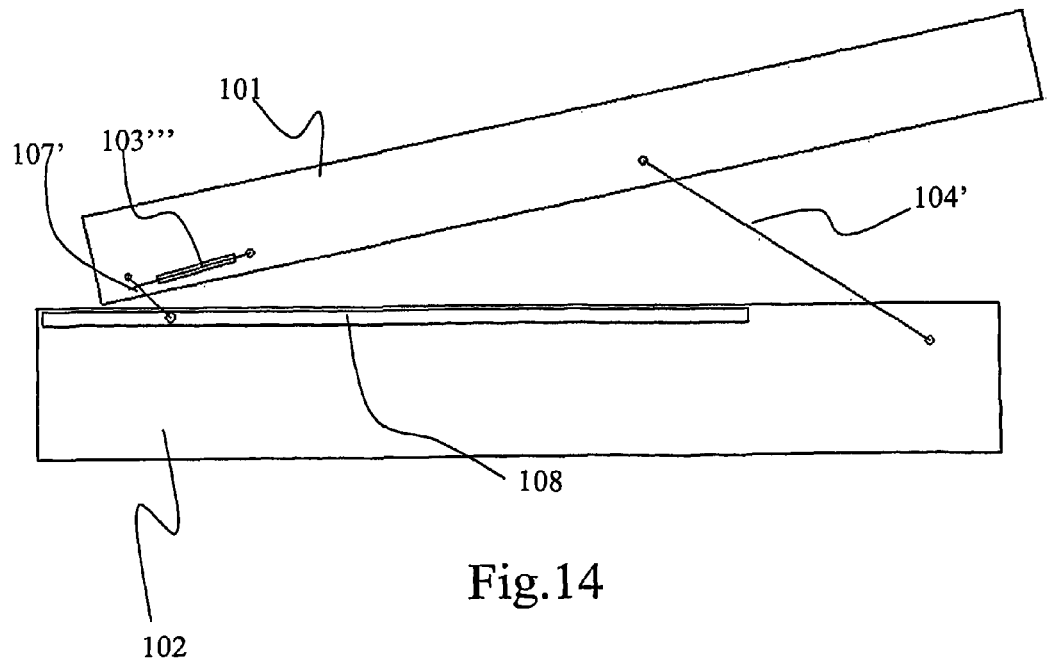
FIG. 14 depicts a cross-section of the apparatus according to an embodiment of the invention.

Referring now to FIG. 14 in the beginning of the first body's opening movement the front edge of the first body 101 is arranged to move along the surface of the second body 102. This is shown in FIG. 14. With the resilient lever 103'", the first body's front edge is arranged to be pressured against the second body's surface. The surface can be a sliding element allowing the first body's edge to slide and be pressed against the second body 102. Furthermore the rail 108 guides the movement.

Figure 15:
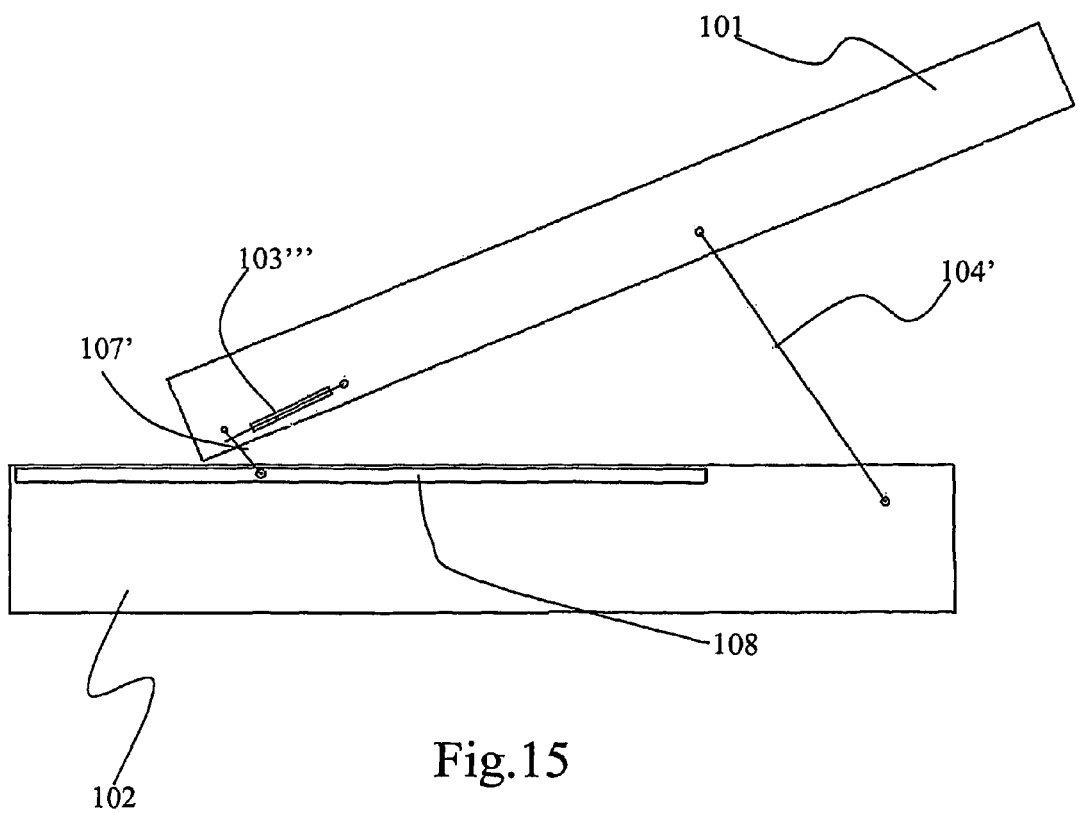
FIG. 15 depicts a cross-section of the apparatus according to an embodiment of the invention.

Referring now to FIG. 15 the first body 101 starts to move or slide towards the open position. After the slide movement the first body's front edge's pressure against engine body begins to release. The front edge of the first body 101 starts to follow the surface guided by the rail 108 and the resilient follower 103". The lever 103", the joint member 104' and the rail 108 are configured so that the edge may not scratch the surface of the second body 102 in the substantial centre between the open and the closed position. For example the keyboard is thereby saved.

Figure 16:
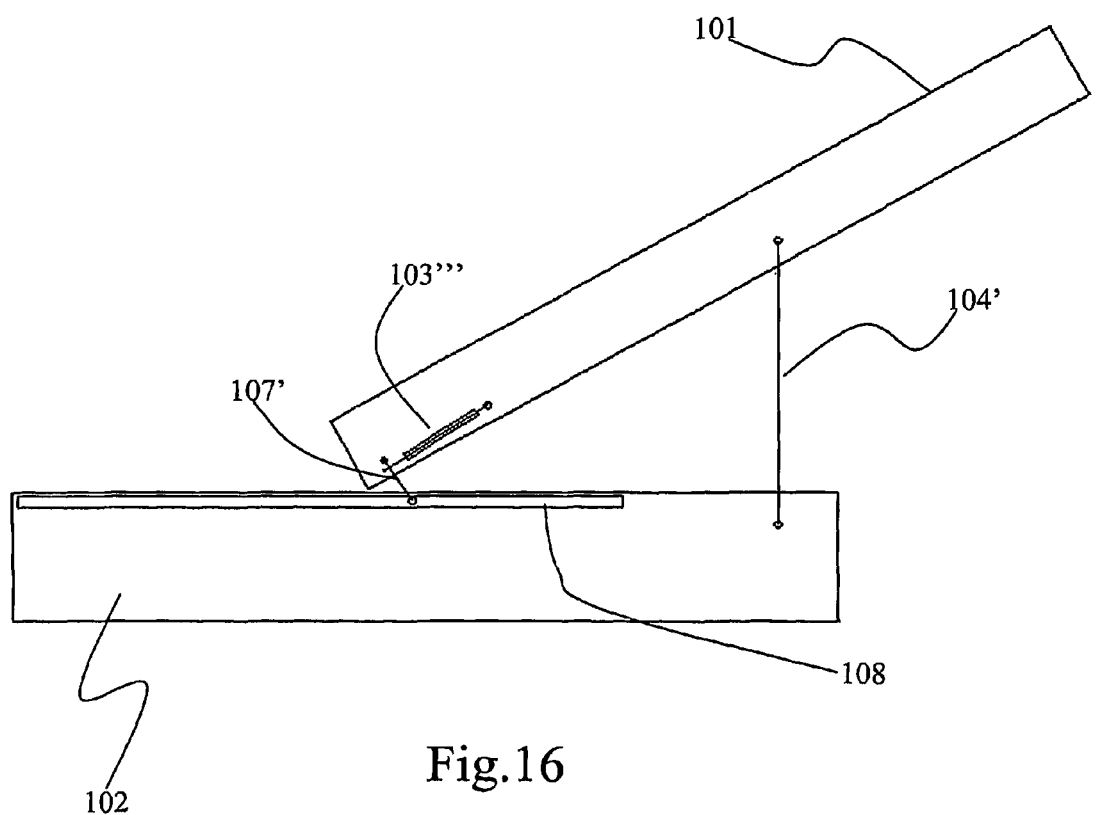
FIG. 16 depicts a cross-section of the apparatus according to an embodiment of the invention.

In the FIG. 16 the joint member 104' is in substantial 90-degree position. The resilient force, such as the spring force, is raised, for example up to 17N but simultaneously arm of it has dropped under 0.5 mm. That gives about 8.5 Nmm torque to the lever 107' and normal force of 1.5N. The joint member 104' is assisting in the first body opening or closing.

Figure 17:
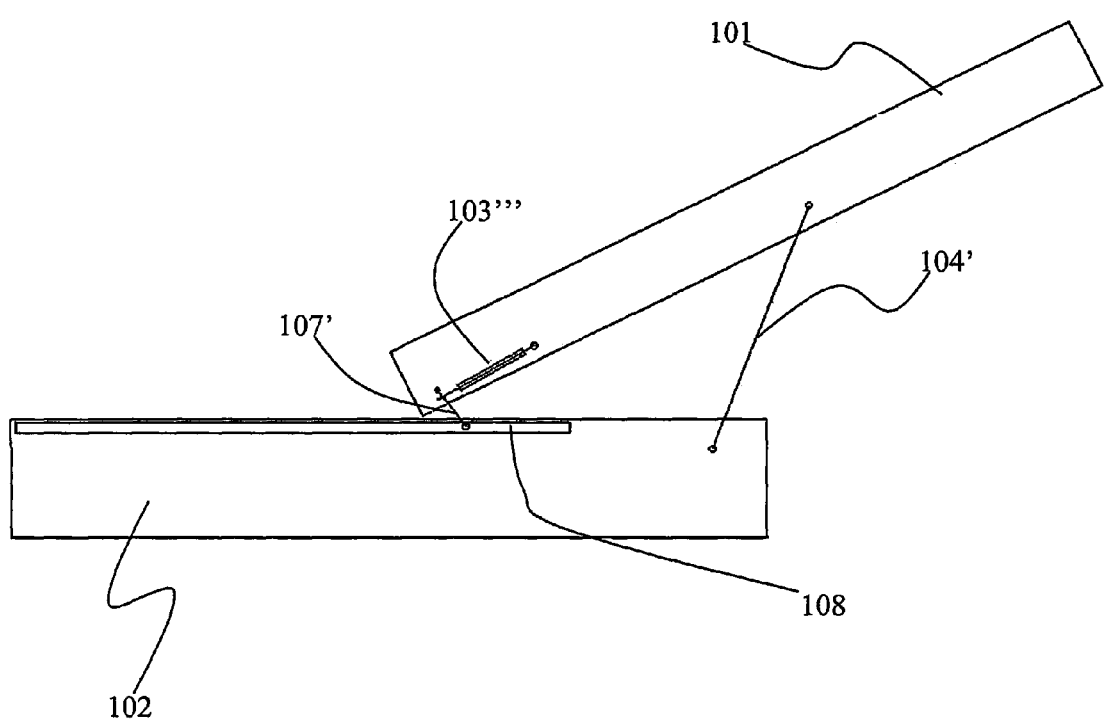
FIG. 17 depicts a cross-section of the apparatus according to an embodiment of the invention.

At the end of opening movement the front edge of the first body 101 starts to approach the second body 102 again as shown in FIG. 17. With the resilient lever 103'" and the geometry of lever 107' and the joint member 104' the front edge is arranged to pressured against the second body 102 as shown in FIG. 17. For example against the sliding elements of the second body located at the end of the second body, and possibly furthermore against the rail 108.

Figure 18:
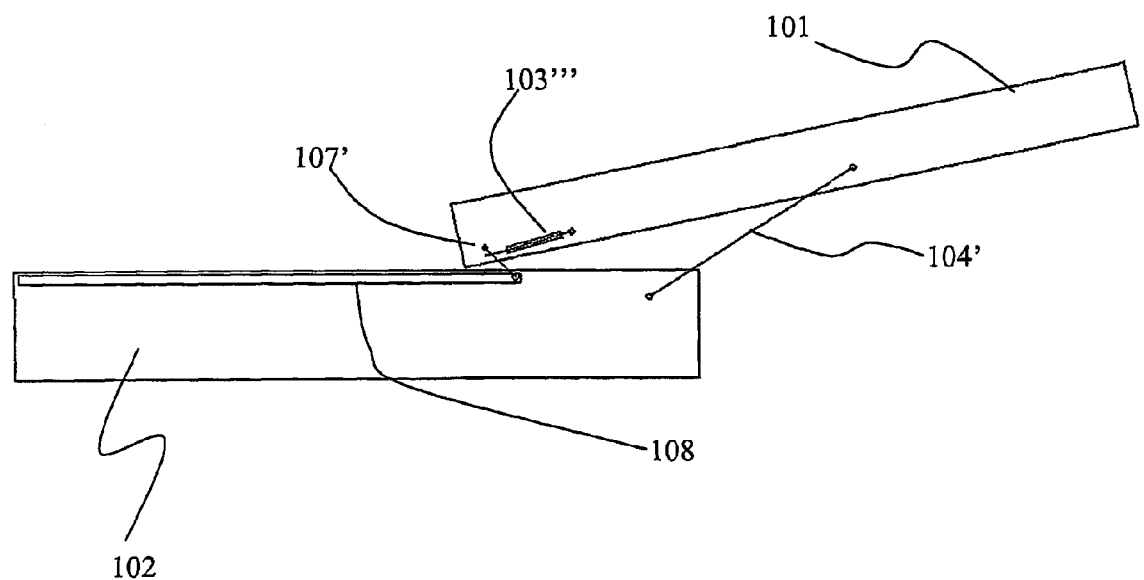
FIG. 18 depicts a cross-section of the apparatus in the open position according to an embodiment of the invention.

Referring now to FIG. 18 after the opening slide movement the front edge's pressure against engine body releases. The lid 101 is now fully open. The resilient force drops to 15N, but because of the geometry and angle of the constructions of element 107', member 103'" and the joint member 104' the pressing force between the blocks 101 and 102 raises to about 8N. The joint member 104' pulls the hinge part toward stopper features. Thus the apparatus is locked to open position. Thus advantageously in an embodiment the first body 101 is locked or pressed into the second body 102 by the force applied by geometry and the resilient lever 103'". Thus the configuration of the resilient lever 103'", the member 107' and the joint member 104' in the apparatus 100 is such that the first body 101 is locked into the open position with respect to the second body 102. There is a locking feeling of the bodies 101,102 for the apparatus 100 also in the open position.

In some examples the angle can be even 90, 45 or smaller.
Ramifications and Scope Although the description above contains many specifics, these are merely provided to illustrate the invention and should not be construed as limitations of the invention's scope. It should be also noted that the many specifics can be combined in various ways in a single or multiple embodiments. Thus it will be apparent to those skilled in the art that various modifications and variations can be made in the apparatuses and processes of the present invention without departing form the spirit or scope of the invention.

The invention claimed is:
1. A portable wireless digital communication apparatus, comprising:
a first body,
a second body, a joint member allowing movement between the first and second bodies, and at least one resilient member arranged relative to the joint member so that in a substantial closed position of the apparatus an end of the first body is arranged to be pressed to the second body, and in a substantial open position of the apparatus said end is arranged to be also pressed to the second body, where between the substantially closed and open positions the end is spaced from the second body.

2. A portable wireless digital communication apparatus according to claim 1, wherein in the substantial closed position another end of the first body is arranged to be pressed to the second body and in the substantial open position said another end is arranged to separate from the second body.

3. A portable wireless digital communication apparatus according to claim 1, wherein the first body is arranged to move generally in parallel with respect to the second body.

4. A portable wireless digital communication apparatus according to claim 1, wherein an angle between the first and second bodies is arranged to be less than 45 degrees.

5. A portable wireless digital communication apparatus according to claim 1, wherein a pressure force between the first and second bodies is arranged be smaller between the open and the closed positions than in the closed position or the open position.

6. A portable wireless digital communication apparatus according to claim 1, wherein the resilient member comprises a resilient lever.

7. A portable wireless digital communication apparatus according to claim 1, wherein the resilient member comprises a resilient follower.

8. A portable wireless digital communication apparatus according to claim 1, wherein the first body comprises a display for the apparatus and the second body comprises a keyboard for the apparatus, and both the first and second bodies establish a chassis of the apparatus.

9. A portable wireless digital communication apparatus according to claim 1, further comprising at least one rail arranged to guide the resilient member.

10. A portable wireless digital communication apparatus according to claim 9, wherein said rail is further arranged to attach the resilient member into the second body.

11. A portable wireless digital communication apparatus according to claim 1, wherein said end is arranged to slide along the surface of the second body during a movement between the opening and the closing positions.

12. A portable wireless digital communication apparatus according to claim 1, further comprising another joint member coupling said resilient member and said second body.

13. A portable wireless digital communication apparatus according to claim 1, wherein the first body comprises said resilient member and said another joint member is attached to the rail of the second body.

14. A portable wireless digital communication apparatus according to claim 1, further comprising another resilient member.

15. A portable wireless digital communication apparatus according to claim 1, wherein the resilient members are positioned generally close to edges of the apparatus so that a keyboard or a display can be positioned between the resilient members.

16. A portable wireless digital communication apparatus according to claim 1, wherein said end comprises said resilient member.

17. A portable wireless digital communication apparatus according to claim 1, wherein said end is resilient.

18. A portable wireless digital communication apparatus, comprising:

first body, second body, means for allowing movement between the first and second bodies, and at least one resilient means for allowing movement so that in a substantial closed position of the apparatus an end of the first body is arranged to be pressed to the second body, and in a substantial open position of the apparatus said end is arranged to be also pressed to the second body, where the first and second bodies are substantially parallel in the substantially closed position, and where the first body substantially immediately becomes angled relative to the second body as the first body is initially moved away from the closed position.

19. An electronic device, comprising a first body and a second body, said first and second bodies arranged to be positioned substantially parallel in a first operational mode, and said first and second bodies having an obtuse disposition in a second operational mode, wherein the first and second bodies are resiliently coupled for relative movement such that relative movement between the first and second bodies has a first transition region where relative movement is opposed and a second transition region where relative movement is unopposed, where between the closed and open positions an end of the first body is spaced from the second body, and where at the closed and open positions the end of the first body is in contact with the second body.

20. An apparatus as in claim 18 where between the closed and open positions the end is spaced from the second body.

* * * * *